United States Patent
Kumar et al.

(10) Patent No.: US 8,705,371 B2
(45) Date of Patent: Apr. 22, 2014

(54) LOCALLY DIAGNOSING AND TROUBLESHOOTING SERVICE ISSUES

(75) Inventors: Shiv Kumar, Marlboro, NJ (US);
Paritosh Bajpay, Edison, NJ (US);
Jackson Liu, Middletown, NJ (US);
Narendra Ravi, Howell, NJ (US);
Raghvendra G. Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 494 days.

(21) Appl. No.: 12/727,931

(22) Filed: Mar. 19, 2010

(65) Prior Publication Data

US 2011/0228665 A1  Sep. 22, 2011

(51) Int. Cl.
  *H04L 12/26* (2006.01)
(52) U.S. Cl.
  USPC .......................................... 370/241; 370/216
(58) Field of Classification Search
  USPC .................. 370/216, 241, 338; 702/183–186;
  714/1–3, 4.1, 4.11, 4.12, 4.2, 4.21, 4.3,
  714/4.4, 4.5, 5.1, 5.11; 709/218, 223–226
  See application file for complete search history.

(56) References Cited

U.S. PATENT DOCUMENTS

| | | | |
|---|---|---|---|
| 6,005,569 A | 12/1999 | Breggin | |
| 6,023,724 A | 2/2000 | Bhatia | |
| 6,205,579 B1 | 3/2001 | Southgate | |
| 6,452,915 B1 * | 9/2002 | Jorgensen | 370/338 |
| 6,658,598 B1 | 12/2003 | Sullivan et al. | |
| 6,826,512 B2 | 11/2004 | Dara-Abrams | |
| 7,200,527 B1 | 4/2007 | Davidov et al. | |
| 7,392,301 B1 * | 6/2008 | Perry et al. | 709/221 |
| 8,094,568 B1 * | 1/2012 | Croak et al. | 370/242 |
| 8,279,805 B2 | 10/2012 | Taylor et al. | |
| 2002/0167936 A1 | 11/2002 | Goodman | |
| 2002/0167937 A1 | 11/2002 | Goodman | |
| 2003/0023980 A1 | 1/2003 | Kikinis et al. | |
| 2003/0137587 A1 | 7/2003 | Braun | |
| 2003/0163380 A1 * | 8/2003 | Vaccarelli et al. | 705/26 |
| 2004/0019691 A1 | 1/2004 | Daymond et al. | |
| 2004/0056958 A1 | 3/2004 | Lee | |
| 2005/0025162 A1 | 2/2005 | Binder | |
| 2005/0081118 A1 * | 4/2005 | Cheston et al. | 714/47 |
| 2005/0183130 A1 | 8/2005 | Sadja | |
| 2006/0098742 A1 | 5/2006 | Meenakshisundaram et al. | |
| 2006/0233313 A1 * | 10/2006 | Adams et al. | 379/21 |
| 2007/0047449 A1 | 3/2007 | Berger | |
| 2007/0050836 A1 | 3/2007 | Stanek | |
| 2007/0192800 A1 | 8/2007 | Walter et al. | |
| 2008/0022336 A1 * | 1/2008 | Howcroft et al. | 725/100 |
| 2008/0126250 A1 | 5/2008 | Chen | |
| 2008/0133978 A1 * | 6/2008 | Angamuthu et al. | 714/39 |
| 2008/0192119 A1 | 8/2008 | Li et al. | |

(Continued)

*Primary Examiner* — Gary Mui
(74) *Attorney, Agent, or Firm* — Toler Law Group, PC (57) ABSTRACT

A method includes detecting, at a customer premises equipment (CPE) device, a problem associated with a network device. The network device is communicatively coupled to the CPE device via a local area network. For example, the CPE device may include a residential gateway (RG). The method includes determining, at the CPE device, whether the problem associated with the network device is locally correctable. When the CPE device determines that the problem is locally correctable, the method includes initiating a corrective action to resolve the problem. When the CPE device determines that the problem is not locally correctable, the method includes sending data associated with the problem from the CPE device to a network system via a wide area network.

20 Claims, 5 Drawing Sheets

(56) References Cited

U.S. PATENT DOCUMENTS

| | | |
|---|---|---|
| 2008/0250443 A1 | 10/2008 | Fan et al. |
| 2008/0267215 A1* | 10/2008 | Blackburn et al. ............ 370/468 |
| 2008/0288977 A1 | 11/2008 | Howcroft et al. |
| 2009/0064251 A1 | 3/2009 | Savoor et al. |
| 2009/0125953 A1 | 5/2009 | Porter et al. |
| 2009/0161530 A1* | 6/2009 | Yang et al. ................... 370/216 |
| 2009/0232008 A1* | 9/2009 | Wurst et al. ................... 370/245 |
| 2009/0299699 A1 | 12/2009 | Wu |
| 2009/0307612 A1 | 12/2009 | Singh et al. |
| 2010/0023994 A1 | 1/2010 | Taylor et al. |
| 2010/0054136 A1* | 3/2010 | Mehta et al. .................. 370/245 |
| 2010/0332906 A1* | 12/2010 | Agrawal et al. ................ 714/37 |
| 2011/0113290 A1* | 5/2011 | Chana et al. .................... 714/43 |
| 2011/0225619 A1* | 9/2011 | Kesireddy et al. ............ 725/115 |
| 2012/0151549 A1 | 6/2012 | Kumar et al. |

\* cited by examiner

LOCALLY DIAGNOSING AND TROUBLESHOOTING SERVICE ISSUES

FIELD OF THE DISCLOSURE

The present disclosure is generally related to diagnosing and troubleshooting service issues.

BACKGROUND

Currently, a customer of a service provider (e.g., a communication service provider) may call the service provider in order to report an issue associated with a service provided by the service provider. A call center customer service representative may attempt to resolve the reported issue over the phone. For example, the customer service representative may remotely initiate tests of a customer premises equipment (CPE) device (e.g., a set-top box (STB) device or a computer device), may remotely restart the CPE device, or may provide instructions to the caller over the phone in an attempt to resolve the issue. In the event that the issue cannot be resolved over the phone, the customer service representative may dispatch a technician to the customer premises. A substantial percentage of customer care call volume may be attributed to issues associated with a network located at a customer premises. For example, many customer care calls are associated with a residential gateway (RG), with a STB device or an associated digital video recorder (DVR), or with connectivity issues related to a local area network (LAN) of the customer premises (e.g., a wireless fidelity ("Wi-Fi") network or a wired network). A reduction in customer call volume and call duration may be desirable in order to improve customer satisfaction and to reduce costs associated with the service provider resolving such issues.

DETAILED DESCRIPTION

In a particular embodiment, a method includes detecting, at a customer premises equipment (CPE) device, a problem associated with a network device. The network device is communicatively coupled to the CPE device via a local area network. The method includes determining, at the CPE device, whether the problem associated with the network device is locally correctable. When the CPE device determines that the problem is locally correctable, the method includes initiating a corrective action to resolve the problem. The method may also include verifying that the corrective action was successful. When the CPE device determines that the problem is not locally correctable, the method includes sending data associated with the problem from the CPE device to a network operation support system.

In another particular embodiment, a CPE device includes a processor and a memory accessible to the processor. The memory stores instructions that are executable by the processor. The instructions are executable by the processor to receive one or more rules or rule sets and device configuration data from a network source via a wide area network, to detect a problem associated with a network device that is communicatively coupled to the CPE device via a local area network, and to determine whether the problem associated with the network device is locally correctable based on the one or more rules and the device configuration data. The instructions are executable by the processor to initiate a corrective action to resolve the problem when the problem is locally correctable and to send data associated with the problem to a network operation support system via the wide area network when the problem is not locally correctable.

In another particular embodiment, a computer-readable non-transitory storage medium is disclosed. The computer-readable non-transitory storage medium stores instructions that are executable by a processor. The instructions are executable by the processor to detect a problem associated with a network device communicatively coupled to a CPE device via a local area network and to determine whether the problem associated with the network device is locally correctable. When the problem is locally correctable via the CPE device, a corrective action to resolve the problem is initiated. When the problem is not locally correctable, data associated with the problem is sent to a network operation support system.

The present disclosure is generally directed to an in-home rule-based intelligent service assurance capability that generally provides proactive service assurance. Proactive service assurance may reduce the time to resolve service related issues and may lead to improved customer experience and customer retention. Proactive service assurance may reduce service provider costs by reducing calls to customer service and may provide leads for additional sales opportunities. The present disclosure may allow for automatic local detection of issues at the customer premises and for resolution of the issues via local corrective action. A reduction in customer call volume may be attained, reducing customer dissatisfaction and costs associated with the service provider resolving such issues.

A network-level automation platform may provide rule building capability. In a particular illustrative embodiment, the network-level automation platform may be referred to as "network RUBY" because of the ability to provide rule building capability. The network-level automation platform may implement end-to-end process automation in the areas of network care and customer care. For example, the network-level automation platform may allow for network fault management and trouble management. As another example, the network-level automation platform may allow for enterprise customer care trouble management. Further, the network-level automation platform may allow for consumer/mass-market customer care trouble management.

The network RUBY may use a forward-inferencing rules engine (e.g., an event-condition-action expert system) to adapt to the changing state of the network and elements of the network. As the state of the network changes, RUBY agents may "fire" one or more rules. Each RUBY agent is a forward-inferencing, state-based rules engine with a collection of rules that collaborates with other agents residing on different computers. In one embodiment, the network RUBY includes multiple rule agents (e.g., over one hundred rule agents) that work collaboratively to solve problems. The RUBY agents may act upon a large number (e.g., millions) of events each day. The present disclosure may extend at least a portion of the rule-based diagnostics model of a RUBY agent to a customer premises (a particular implementation is hereinafter referred to as "micro-RUBY"). A micro-RUBY system at the customer premises may have a single agent per device and addresses a much smaller number of events per unit time.

With respect to the RUBY agent "firing" one or more rules as the state of the network changes, a first problem scenario may relate to a fault event at an optical switch. The network RUBY may receive a major fault event from an optical switch, indicating a loss of frame at one of the ports of the optical switch. The network RUBY may select a set of rules to initiate a tracking event and to create a working ticket associated with the event. The network RUBY may subsequently (e.g., within a few milliseconds) receive a critical fault event from the same optical switch, indicating a loss of signal on the same port. The network RUBY may determine a new set of rules that updates the working ticket with new event data, correlates the two fault events, initiates repair action (with the critical fault event being the focus), and verifies and validates the repair. A second problem scenario may relate to receipt of a series of fault events. For example, the network RUBY may receive a series of fault events within milliseconds of receiving the first fault event, indicating that all ports on the card hosting the port for the first event are down. The same network RUBY agent may select a different set of rules in this scenario. In a third problem scenario, a third event may arrive that indicates that the power to the card is out. In this variation, the RUBY agent may create a work-center ticket that is assigned to a work-center technician for repair. Typically, port/card events have two network sources, a starting end and a terminating end. The network RUBY may fire another set of rules in parallel to correlate these two events as being the same event. In one embodiment, this may occur regardless of the first three scenarios.

Thus, each RUBY agent adapts to the state of the network, thereby addressing an appropriate group of related problems and ignoring "false positives." The priority of problem solving rules that are applied may depend on the severity and scope of the event. In other rules-based systems (e.g., systems other than network RUBY) that perform sequential rule execution or task orchestration or a stateless rule engine, a problem solving session is not interrupted until all rules/tasks are executed. Such rule engines may attempt to locate the appropriate rule to fire by examining the new state of the network, thereby having to restart the problem solving session multiple times.

A rule-based diagnostics model at the customer premises (e.g., a micro-RUBY system) may enable local decision making and problem solving. In a particular embodiment, the micro-RUBY system is stored at a residential gateway (RG) and/or at a set-top box (STB) device or other CPE device located at the customer premises. The RG may be used as a gateway to connect one or more devices at the customer premises to the Internet or to another wide area network (WAN). The micro-RUBY system may correlate events from one or more devices located at the customer premises and may determine issues associated with such devices. Further, the micro-RUBY system may collaborate with one or more service provider operation support systems (OSSs) for end-to-end automation. Still further, the micro-RUBY system may provide a rule-based platform for users (e.g., a customer, a field technician, or a customer call center representative) to configure device behavior. The micro-RUBY system may be expandable in order to provide configuration, management and automation services for multiple devices in the home (e.g., home automation systems, biometric monitoring, etc.). As with the network RUBY, the micro-RUBY system may use a forward-inferencing rules engine to adapt to the changing state of the network (e.g., a local area network at a customer premises) and may adapt to elements of the network. As the state of the network changes, the micro-RUBY system may select appropriate rules.

The micro-RUBY rules may be stored at a CPE device (e.g., at a residential gateway). Rules and device configuration data stored at the CPE device may include a subset of the rules and device configuration data associated with the network RUBY system. Thus, the network RUBY system may include a more expansive collection of rules and device configuration data than the rules and device configuration data stored at the CPE device. The in-home system may collect fault event and performance monitoring (PM) data from a network device in communication with the CPE device via a local area network of the customer premises. The in-home system may store collected data for a configurable period. Further, the collected fault event and PM data may be correlated dynamically and in real-time. Further, rule-based proactive corrective actions may be taken. For example, the proactive corrective actions may include a local action (e.g., turn on wireless encryption and initiate STB reboot) if a fault (i.e., error) may be corrected locally. The proactive corrective actions may include a network action if the error cannot be corrected locally. For example, the network action may include the CPE device sending the collected fault and PM data to one or more network OSSs. In response to receiving the collected data, the network OSSs may take corrective action to address the error. Upon initiation of the corrective action, the in-home system may verify availability of corrected functionality. In one embodiment, the in-home system provides a universal serial bus (USB) interface that allows a customer to make permitted changes (e.g., manage wireless encryption protocol (WEP) key settings and initiate manual STB reboot).

The devices in communication with the CPE device may collect and send fault and PM data to micro-RUBY logic stored at the CPE device. Further, the devices may act on administrative commands received from the micro-RUBY logic (e.g., a reboot command or a re-synch command). The network OSSs may provision rules and device configuration data to the micro-RUBY logic, receive fault and PM data from the micro-RUBY logic, correlate received fault and PM data with network data, and take proactive corrective action. In one embodiment, the collected fault and PM data may be used to up-sell new services (e.g., detection of low downstream PM data may be a basis for providing advertisements to a user of the CPE device for a higher bandwidth service).

Customer care call volume reduction (i.e., call avoidance and deflection) may be achieved by performing autonomous localized troubleshooting in the home network (e.g., the network at the customer premises) and by cooperative and collaborative troubleshooting with network operation and business support systems (i.e., OSS and BSS). For example, the present disclosure may allow for interaction with a user of a CPE device to address a detected issue. As an example, the user may receive an instruction displayed at a display device indicating that a communication cable coupled to the CPE device is not securely fastened. As another example, the user may receive an instruction to move a power cord away from a communication connection to avoid interference. It should be noted that the home network may also refer to a network at any customer location (e.g., a network at a business location). Further, the present disclosure provides a modular platform for management of upgrades of home devices.

Figure 1:
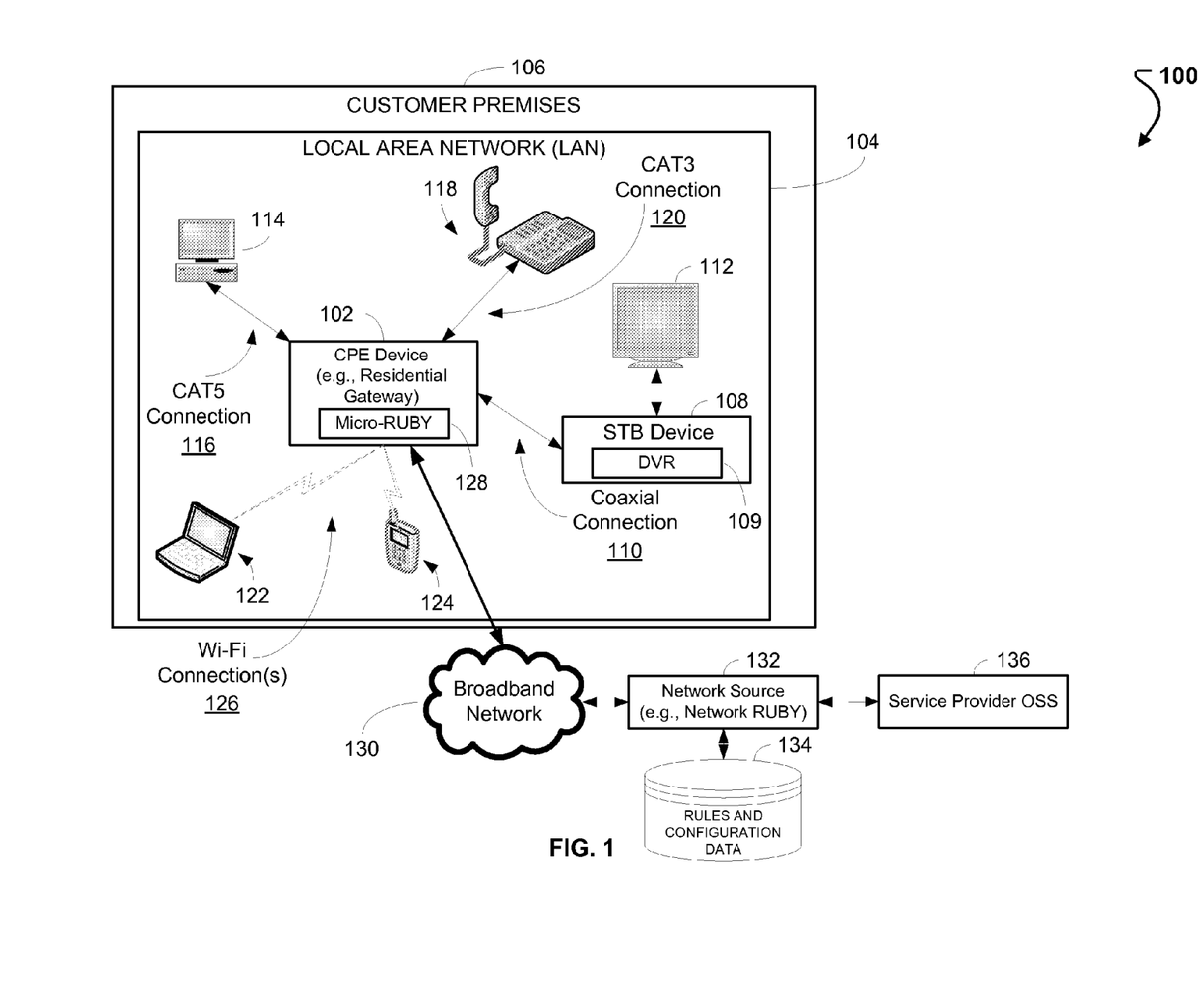
FIG. 1 is a block diagram of a particular embodiment of a system of diagnosing and troubleshooting an issue associated with a service at a customer premises.

Referring to FIG. 1, a particular embodiment of a system to diagnose and troubleshoot an issue associated with a service at a customer premises is illustrated and generally designated 100. The system includes a customer premises equipment (CPE) device 102 that is communicatively coupled to at least one network device via a local area network (LAN) 104 of a customer premises 106. In the embodiment illustrated in FIG. 1, the CPE device 102 includes a residential gateway (RG). In alternative embodiments, the CPE device 102 may include FemtoCell communications capability, or the CPE device 102 may be another type of device (e.g., a tablet computer or a STB device). The system of FIG. 1 may provide for localized diagnosis and repair in a home network. The system of FIG. 1 may allow the CPE device 102 to automatically detect RG, STB, and Wi-Fi/LAN issues and to resolve the issues by taking local corrective action (e.g., using micro-RUBY logic 128 stored at the CPE device 102). If an issue cannot be resolved locally, collaboration with one or more network operation support systems (OSSs) may be used to solve the problem.

In the embodiment illustrated in FIG. 1, the CPE device 102 is communicatively coupled to a set-top box device 108 (e.g., via a wired coaxial cable connection 110) that is coupled to a display device 112. In the embodiment illustrated, the STB device 108 includes a digital video recorder (DVR) 109. Further, the CPE device 102 of FIG. 1 is communicatively coupled to a computer 114 (e.g., via a wired CAT5 cable connection 116) and to a telephone 118 (e.g., via a wired CAT3 cable connection 120). Further, in the embodiment illustrated, the CPE device 102 is communicatively coupled to a second computer 122 and to a portable communication device (e.g., a smart phone) 124 via a wireless LAN connection 126 (e.g., a Wi-Fi connection). The CPE device 102 is communicatively coupled to a service provider via a network 130 (e.g., a broadband network). The service provider may include a network RUBY 132 at network-side equipment that stores rules and configuration data 134. The network RUBY 132 may be communicatively coupled to at least one service provider operation support system (OSS) 136.

In operation, the CPE device 102 detects a problem associated with a network device communicatively coupled to the CPE device 102. For example, the CPE device 102 may detect a problem with the set-top box device 108. As an illustrative example, the set-top box device 108 may be unable to display a picture at the display device 112. The micro-RUBY logic 128 stored at the CPE device 102 determines whether the problem associated with the set-top box device 108 is locally correctable. When the CPE device 102 determines that the problem is locally correctable, the CPE device 102 initiates a corrective action to resolve the problem. For example, the corrective action may include a reboot of the set-top box device 108. As another example, the CPE device 102 may display a message via another device (e.g., via the computer 114, via the second computer 122, or via the smart phone 124) indicating to the user to check one or more communication connections between the set-top box device 108 and the display device 112 or between the CPE device 102 and the set-top box device 108. When the CPE device 102 determines that the problem is not locally correctable, the CPE device 102 sends data associated with the problem (e.g., fault data and automation results) to the service provider OSS 136 via the broadband network 130.

As another example, the CPE device 102 (e.g., a residential gateway) may detect a loss of synchronization with the broadband network 130. For example, a cable that links the customer premises 106 to the broadband network 130 may have been cut or otherwise disconnected from network equipment (e.g., a video ready access device (VRAD) or a digital subscriber line access multiplexer (DSLAM) associated with a neighborhood of the customer premises 106). To illustrate, a coaxial cable linking the customer premises 106 to the VRAD may be inadvertently cut by someone digging in the neighborhood, or the VRAD may be damaged (e.g., by an automobile collision). As a result of a RG-VRAD synchronization failure, the micro-RUBY logic 128 may generate an event alarm. In this case, the problem may not be locally correctable, and the CPE device 102 may display a message (e.g., via the STB device 108) indicating the VRAD connectivity failure. The message may provide further information to assist with troubleshooting. For example, the information may be useful to a call center customer service representative or to a field service technician in diagnosing the problem. In one embodiment, due to the connection disruption with the broadband network 130, the micro-RUBY logic 128 may cause the RG to alert the network RUBY 132 via an alternative network (e.g., via a wireless network). For example, "cellemetry" (e.g., telemetry via a cellular network) may be used to provide a "last gasp" message to the network RUBY 132 in order to alert the service provider to the problem.

As another example, the micro-RUBY logic 128 may detect a denial of service (DOS) attack directed towards the CPE device 102. A DOS attack may result in pixilation or freezing of multimedia content or other undesirable events. In one embodiment, a DOS attack associated with multiple Internet control message protocol (ICMP) queries may be detected based on "counter information" (e.g., PM and event data) associated with various internet protocol (IP) devices communicatively coupled to the LAN 104. In response to detecting the DOS attack, the micro-RUBY logic 128 may initiate a port swap that deflects incoming ICMP traffic associated with the DOS attack. Further, in response to detecting the DOS attack, the micro-RUBY logic 128 may alert the network RUBY 132 or the service provider OSS 136 for potential follow-up action by the service provider.

As another example, the CPE device 102 may detect a problem with a network device communicatively coupled to the CPE device 102 via the wireless LAN 126. As an illustrative example, the second computer 122 or the smart phone 124 may be configured to communicate via a wireless encryption protocol (WEP). The micro-RUBY logic 128 stored at the CPE device 102 determines whether the problem is locally correctable. When the CPE device 102 determines that the problem is locally correctable, the CPE device 102 initiates a corrective action to resolve the problem. For example, the corrective action may include communicating with the network device via the WEP. Similarly, the corrective action may include adjusting a WEP setting at the CPE device 102 in order to communicate wirelessly with the network device. For example, a new network device may be added, and the corrective action may include adjusting one or more configuration settings such that the CPE device 102 and the new network device can communicate wirelessly.

As a further example, the CPE device 102 may detect a replacement of the STB device 108 and may receive device details associated with the replacement STB device (not shown). Further, the CPE device 102 may upload the device details associated with the replacement STB device to the service provider via the broadband network 130. The micro-RUBY logic 128 may store one or more configuration settings associated with the STB device 108 (i.e., the STB device that has been replaced). In response to detecting that the STB device 108 has been replaced, the stored configuration settings may be automatically transferred to the replacement STB device, thereby reducing configuration time for a user or for an on-site technician.

In one embodiment, the CPE device 102 receives one or more rules and device configuration data from the network RUBY 132 via the broadband network 130 and stores the information locally (e.g., at a memory). The rules and device configuration data may be a subset of the rules and configuration data 134 accessible to the network RUBY 132. For example, in the embodiment illustrated in FIG. 1, the micro-RUBY logic 128 of the CPE device 102 may include rules and configuration data associated with at least the STB device 108, the display device 112, the computer 114, the telephone 118, the second computer 122, and the smart phone 124. The CPE device 102 may determine whether one or more problems associated with the devices of the customer premises 106 are locally correctable based on the locally stored rules and device configuration data.

In a particular illustrative embodiment, one or more events received at the micro-RUBY logic 128 may indicate a problem with the STB device 108. The micro-RUBY logic 128 may analyze fault and performance monitoring (PM) data events for problem signatures. The CPE device 102 may be able to isolate the source of the problem with the STB device 108 to correct the problem locally. The CPE device 102 may then verify that the problem has been resolved. Thus, a call from a user at the customer premises 106 reporting the problem may be avoided. The CPE device 102 may upload data and analysis results to the network RUBY 132. In another particular illustrative embodiment, a problem may be predicted by the micro-RUBY logic 128. For example, the micro-RUBY logic 128 may detect degradation of communication speed (e.g., a negative performance trend) via the broadband network 130. The micro-RUBY logic 128 may use historical and trending data to predict failure possibilities. In one embodiment, the CPE device 102 may initiate corrective action when a negative performance trend satisfies a threshold. For example, the degradation of communication speed may be associated with a virus, spyware, adware, or other malware. In this case, the corrective action initiated by the CPE device 102 may be based on a procedure included in the rules and device configuration data received from the network RUBY 132. Further, an on-site technician may download data from the CPE device 102 for further analysis (e.g., via a universal serial bus (USB) interface when at the customer premises 106 or via the network RUBY 132 when remote from the customer premises 106). As another example, poor communication speed may provide an up-sell opportunity with respect to a higher priced broadband access plan with increased bandwidth.

The CPE device 102 may receive updated rules and device configuration data from a network source for network devices communicatively coupled to the CPE device 102. The updated rules and device configuration date may be requested by the CPE device 102 or may be transmitted to the CPE device 102 from the network RUBY 132 (e.g., periodically or in response to an update to a rule or to configuration data).

When the CPE device 102 determines that a problem is not locally correctable, the service provider OSS 136 may determine the source of the problem based at least in part on the data associated with the problem received from the CPE device 102. In one embodiment, the service provider OSS 136 may initiate a second corrective action via the CPE device 102 upon determining the source of the problem. For example, in the case where the STB device 108 may be unable to display a picture at the display device 112 and the CPE device 102 is unable to correct the problem locally, the service provider OSS 136 may initiate corrective action via the CPE device 102. The corrective action may include a reboot of the STB device 108, adjusting one or more configuration settings of the STB device 108, or displaying an error message at the display device 112, among other alternatives. Similarly, in the case of a problem with one of the network devices 122, 124 that communicate with the CPE device 102 via the wireless LAN 126 and when the CPE device 102 is unable to correct the problem locally, the service provider OSS 136 may initiate another corrective action via the CPE device 102.

In a particular embodiment, the micro-RUBY logic 128 stored locally at the CPE device 102 may communicate with the network RUBY 132 to upload fault data, performance measurement data, and automation results (e.g., for remote surveillance management). Such information may be used to update the rules and configuration data 134 at the network level. For example, when the display device 112 is unable to display a picture and the CPE device 102 is unable to resolve the problem locally, the rules and configuration data 134 may be updated based on the corrective action initiated by the service provider 136. This information may then be propagated as updated rules and configuration data to other CPE devices communicatively coupled to the network RUBY 132 via the broadband network 130. The micro-RUBY logic 128 may also download pre-packaged rules, software, and device configuration updates from the network RUBY 132.

Thus, the system of FIG. 1 may allow for reduction in customer call volume (i.e., call avoidance and deflection) associated with problems at a network located at a customer premises. Rather than a call center customer service representative resolving an issue over the phone, remotely initiating tests or other remedial measures, or providing instructions over the phone, the system of the present disclosure may allow for local correction of the problem.

Figure 2:
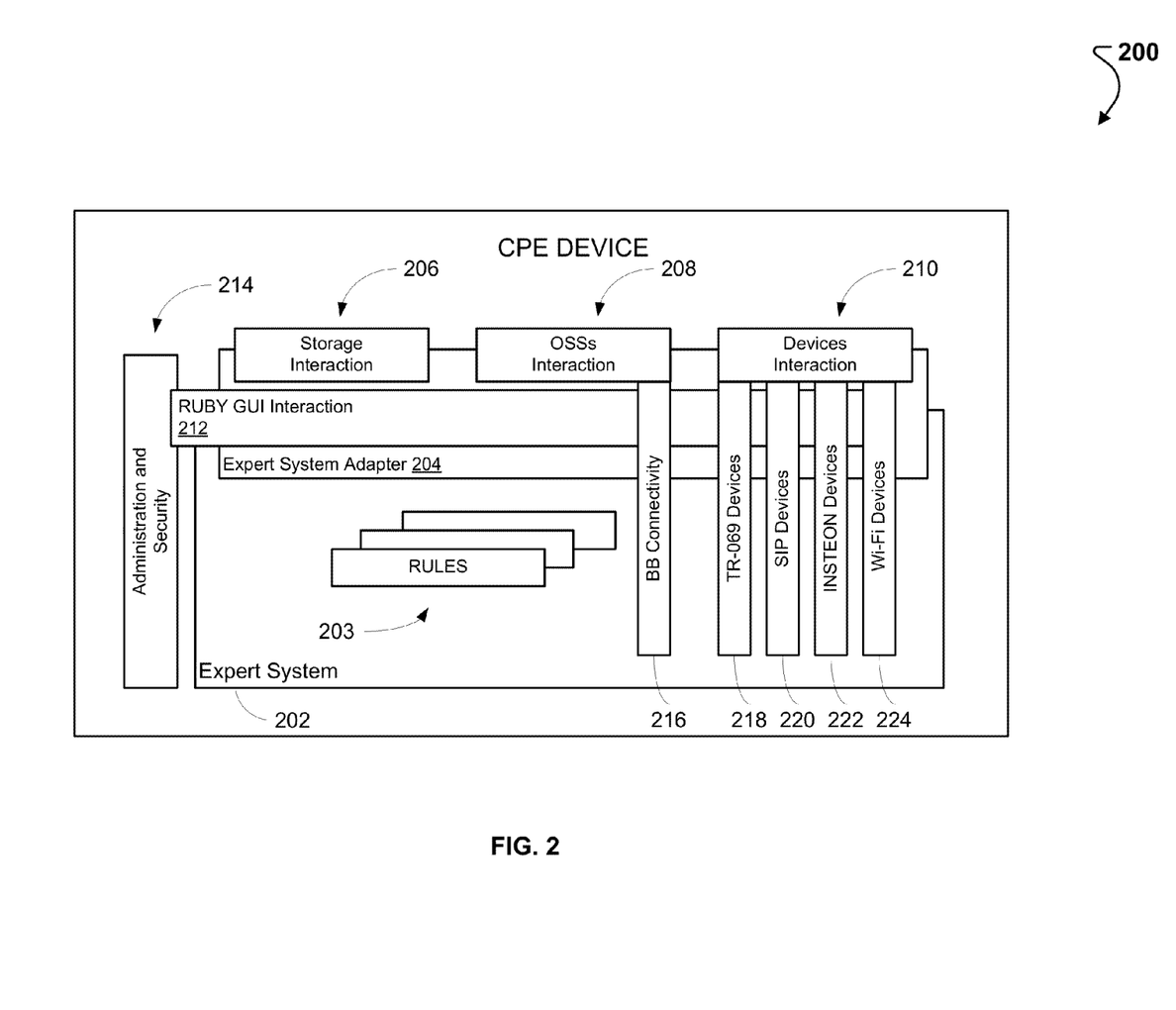
FIG. 2 is a block diagram of a particular embodiment of a customer premises equipment (CPE) device to locally diagnose and troubleshoot an issue associated with a service at a customer premises.

Referring to FIG. 2, a particular illustrative embodiment of a CPE device to locally diagnose and troubleshoot an issue associated with a service is illustrated and generally designated 200. In one embodiment, the CPE device 200 is the CPE device 102 of FIG. 1. The CPE device 200 of FIG. 2 may provide support for various devices and in-home protocols (e.g., Broadband Forum (BBF) standards), various "automation triggers", and various "automation functions."

With respect to devices, the CPE device 200 may offer support for a RG, a FEMTO cell, a STB device, a bridge, a router, a switch, or a storage device (e.g., a network storage device or a USB storage device), among other alternatives. With respect to protocols, the CPE device 200 may offer support for TR-098 protocol communication (e.g., Internet gateway data model for TR-069), for TR-106 protocol communication (e.g., data model for TR-069 enabled devices), for TR-135 protocol communication (e.g., TR-069 data model STB), for TR-140 protocol communication (e.g., TR-069 data model storage service devices), or for TR-196 protocol communication (e.g., FEMTO access point service data model), among other alternatives.

Example "automation triggers" may include device fault events, device PM events, application performance data, or other data model based events. For example, a device PM event may be associated with counters, packet data, or low-level data (e.g., signal-to-noise ratios), among other alternatives. Example "automation functions" may be related to device identification, device registration, downloading of device specific rules, device fault/performance management, services management, service interruption prevention, collation and sending of information to a service provider for collaborative problem solving, downloading of service specific rules, and support. For example, device/performance management automation functions may include diagnosis, repair, test, or verification functions. Services management functions may include Internet service and LAN service functions, video application functions, gaming services functions, or Voice over Internet Protocol (VoIP) functions. Prevention of service interruption functions may include functions related to prevention of denial of service (DOS) attacks. Support functions may include functions associated with customer service agents and field technicians, self-solve capabilities by a customer, or device configuration by the customer, an agent, or a field technician.

In the embodiment illustrated, the CPE device 200 includes an expert system 202 that stores one or more rules 203 and an expert system adapter 204. In one embodiment, the expert system 202 includes the micro-RUBY logic 128 of FIG. 1. The expert system adapter 204 is associated with a storage interaction component 206, an OSSs interaction component 208, and a devices interaction component 210. The expert system adapter 204 is also associated with a RUBY graphical user interface (GUI) interaction component 212 that allows for interaction with respect to administration and security 214.

With respect to the storage interaction component 206, the rules 203 may store intermediate results on a local storage device of the CPE device 200. For example, the results may be stored on a memory of a subscriber gateway (e.g., a residential gateway or a gateway associated with another customer location). The rules 203 may store final results for upload to an OSS. Further, configuration data for the rules 203 is also associated with the storage interaction component 206. With respect to the OSSs interaction component 208, the rules 203 may use this interface to upload results, to download new rule sets, or to download new specifications associated with new services. In the embodiment illustrated, the OSSs interaction component 208 is associated with a broadband (BB) connectivity component 216 to interface with a broadband network (e.g., the broadband network 130 of FIG. 1). With respect to the devices interaction component 210, the rules 203 may use these interfaces to register or to provision devices (e.g., the devices 108, 112, 114, 118, 122, and 124 on the LAN 104 of FIG. 1). The rules 203 may also use these interfaces to retrieve alarms and performance events; to analyze, repair, and test devices; and to configure rules for device behavior (e.g., via a GUI).

In one embodiment, the RUBY GUI interaction component 212 provides a GUI that allows for ease of programming of the rules 203. For example, the GUI may support configuration of user-defined services, home devices, notifications, information gathering, communications, or any combination thereof. Further, the GUI may allow a user to self-troubleshoot network issues without the assistance of a customer service representative or an on-site technician. In one embodiment, the GUI is adapted to be displayed on a display of a smart phone. Further, the GUI may provide on-site technicians with access to tools and protocols to download local diagnostic data, historical data, or trending data (e.g., data collected by the micro-RUBY logic 128 of FIG. 1). Further, the GUI may allow for configuration of an amount of historical and trending data to be maintained locally at the CPE device 200.

In the embodiment illustrated in FIG. 2, the devices interaction component 210 includes a TR-069 devices interface 218. TR-069 refers to a basic protocol for in-home devices based on a digital subscriber line (DSL) technical specification titled "CPE WAN Management Protocol (CWMP)." CWMP is an application layer protocol for remote management of end-user devices. In the embodiment illustrated in FIG. 2, the devices interaction component 210 also includes a session initiation protocol (SIP) devices component 220. SIP is an internet protocol (IP) network protocol that may be used for voice over IP (VoIP) telephony. In the embodiment illustrated in FIG. 2, the devices interaction component 210 also includes an INSTEON devices component 222. INSTEON uses power and radio frequency (RF) to communicate with and to automate home appliances (e.g., based on the X10 industry standard for communication among electronic devices used for home automation). In the embodiment illustrated in FIG. 2, the devices interaction component 210 also includes a Wi-Fi devices component 224. Wi-Fi represents an alternative (and complimentary to INSTEON) technology that allows communication with home appliances in order to automate their configuration and use. The devices interaction component 210 may also offer support for the digital living network alliance (DLNA) standard that is used for sharing content amongst consumer electronic devices and may offer support for the Bluetooth standard that is a low power technology that allows for short-range wireless communications (e.g., with home appliances).

Thus, FIG. 2 illustrates a particular embodiment of a CPE device that may allow for reduction in customer call volume (i.e., call avoidance and deflection) associated with a problem resolution at a network located at a customer premises. Rather than a call center customer service representative resolving an issue over the phone, remotely initiating tests or other remedial measures, or providing instructions over the phone, the system of the present disclosure may allow for local correction of the problem.

Figure 3:
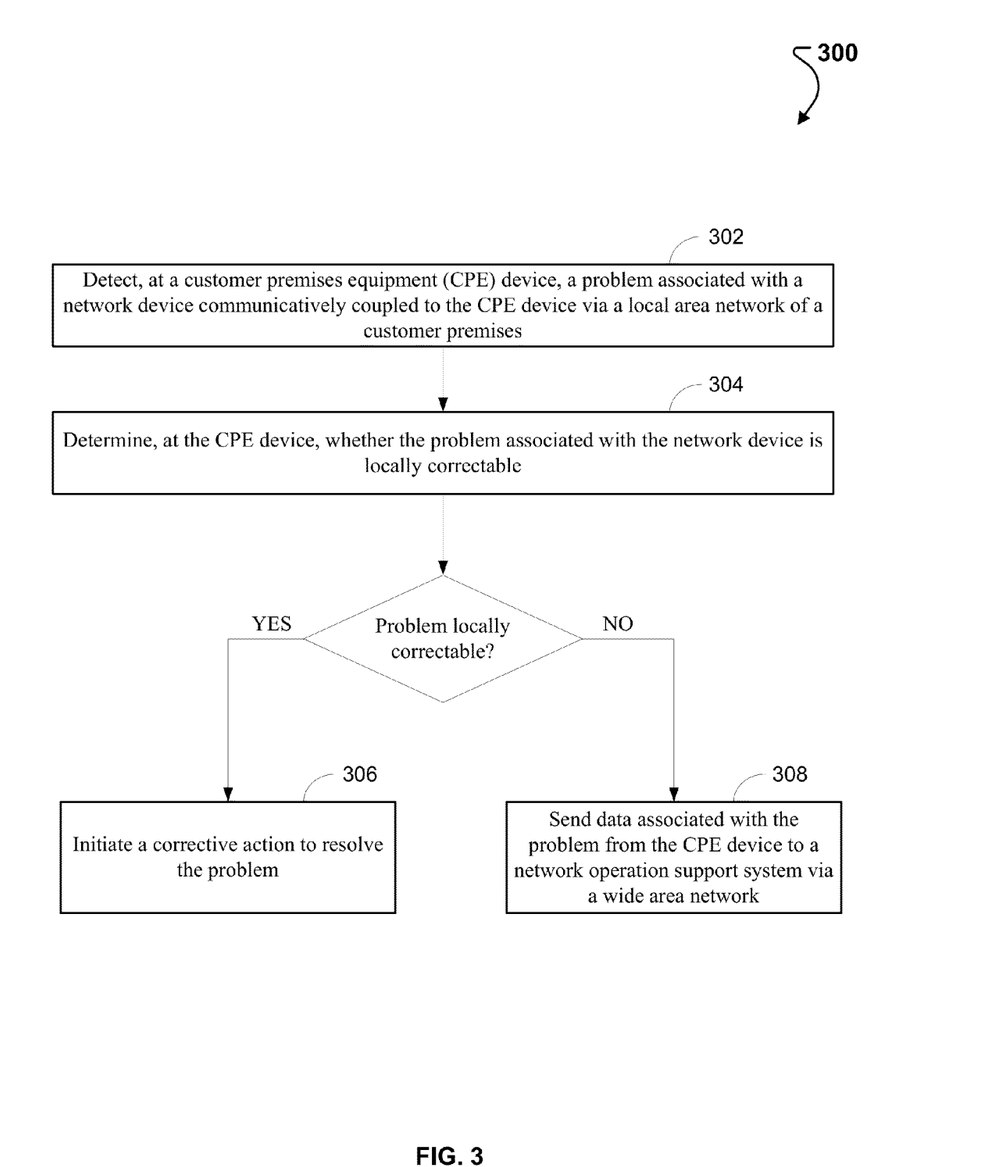
FIG. 3 is a flow chart of a particular embodiment of a method of locally diagnosing and troubleshooting an issue associated with a service at a customer premises.

Referring to FIG. 3, a flow chart of a particular embodiment of a method of locally diagnosing and troubleshooting an issue associated with a service at a customer premises is illustrated, at 300. The method of FIG. 3 may allow for a reduction in customer call volume (i.e., call avoidance and deflection) associated with problems at a network located at a customer premises.

The method includes detecting, at a CPE device, a problem associated with a network device communicatively coupled to the CPE device via a local area network of a customer premises, at 302. For example, the CPE device 102 of FIG. 1 may detect a problem associated with one of the network devices of the LAN 104. As an illustrative example, the CPE device 102 of FIG. 1 may detect a problem associated with the STB device 108 (e.g., the display device 112 is unable to display a picture). The method includes determining, at the CPE device, whether the problem associated with the network device is locally correctable, at 304. For example, the CPE device 102 of FIG. 1 may determine whether the problem is locally correctable (e.g., whether the inability of the display device 112 to display a picture is locally correctable).

When the CPE device (e.g., the CPE device 102 of FIG. 1) determines that the problem is locally correctable, the method includes initiating a corrective action to resolve the problem, at 306. For example, the CPE device 102 may provide a message to a user that a cable connecting the STB device 108 to the display device 112 is unplugged. In this case, because the display device 112 is unable to display a picture, the CPE device 102 may deliver the message to another device of the local area network 104 (e.g., a message to at least one of the devices 114, 118, 122, and 124).

When the CPE device determines that the problem is not locally correctable, the method includes sending data associated with the problem from the CPE device to a network operation support system via a wide area network, at 308. For example, the CPE device 102 of FIG. 1 may send data associated with the problem to the service provider OSS 136 via the broadband network 130.

Figure 4:
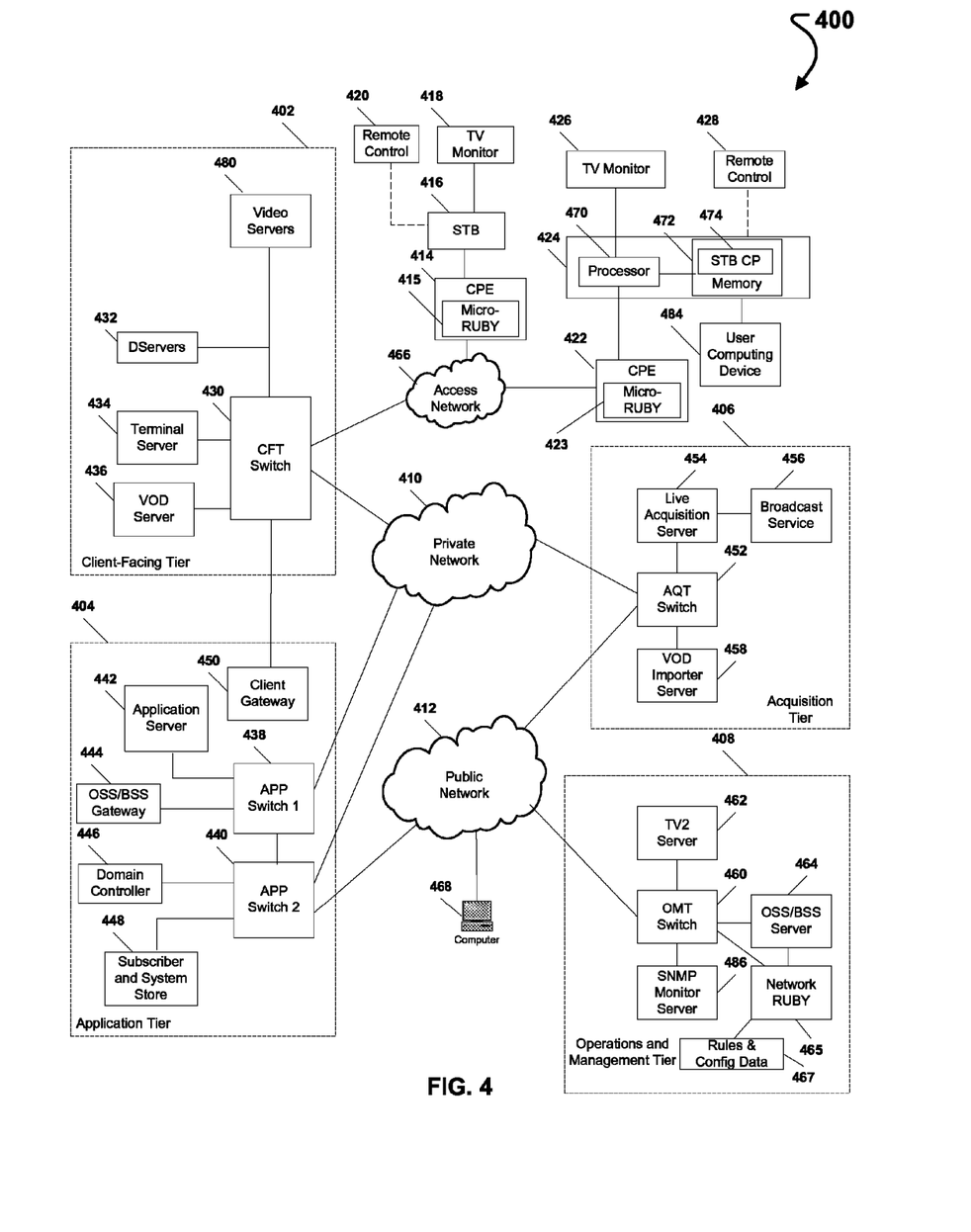
FIG. 4 is a block diagram of an illustrative embodiment of an Internet Protocol Television (IPTV) system to provide one or more rules and configuration data to a CPE device to locally diagnose and troubleshoot an issue associated with a service at a customer premises.

Referring to FIG. 4, an illustrative embodiment of an Internet Protocol Television (IPTV) system is illustrated and is generally designated 400. As shown, the system 400 can include a client facing tier 402, an application tier 404, an acquisition tier 406, and an operations and management tier 408. Each tier 402, 404, 406, 408 is coupled to a private network 410; to a public network 412, such as the Internet; or to both the private network 410 and the public network 412. For example, the client-facing tier 402 can be coupled to the private network 410. Further, the application tier 404 can be coupled to the private network 410 and to the public network 412. The acquisition tier 406 can also be coupled to the private network 410 and to the public network 412. Additionally, the operations and management tier 408 can be coupled to the public network 412.

As illustrated in FIG. 4, the various tiers 402, 404, 406, 408 communicate with each other via the private network 410 and the public network 412. For instance, the client-facing tier 402 can communicate with the application tier 404 and the acquisition tier 406 via the private network 410. The application tier 404 can communicate with the acquisition tier 406 via the private network 410. Further, the application tier 404 can communicate with the acquisition tier 406 and the operations and management tier 408 via the public network 412. Moreover, the acquisition tier 406 can communicate with the operations and management tier 408 via the public network 412. In a particular embodiment, elements of the application tier 404, including, but not limited to, a client gateway 450, can communicate directly with the client-facing tier 402.

The client-facing tier 402 can communicate with user equipment via an access network 466, such as an Internet Protocol Television (IPTV) access network. For example, the access network 466 may be the broadband network 130 of FIG. 1. In an illustrative embodiment, customer premises equipment (CPE) 414, 422 can be coupled to a local switch, router, or other device of the access network 466. The client-facing tier 402 can communicate with a first representative set-top box device 416 at a first customer premise via the first CPE 414 and with a second representative set-top box device 424 at a second customer premise via the second CPE 422. The CPEs 414, 422 can include routers, local area network devices, modems, such as digital subscriber line (DSL) modems, any other suitable devices for facilitating communication between a set-top box device and the access network 466, or any combination thereof. To illustrate, either of the CPEs 414, 422 may be the CPE device 102 of FIG. 1 (e.g., a residential gateway). Either or both of the CPEs 414, 422 may include micro-RUBY logic 415, 423 (e.g., the micro-RUBY logic 128 of FIG. 1). Further, either or both of the CPEs 414, 422 may communicate with a network RUBY 465 via the access network 466. In the embodiment illustrated in FIG. 4, the network RUBY 465 is located at the operations and management tier 408. In alternative embodiments, the network RUBY 465 may be located at other locations/tiers of the system 400. Either of the set-top box devices 416, 424 may be the STB device 108 of FIG. 1.

In a particular embodiment, the client-facing tier 402 can be coupled to the CPEs 414, 422 via fiber optic cables. Alternatively, the CPEs 414, 422 can be digital subscriber line (DSL) modems that are coupled to one or more network nodes via twisted pairs, and the client-facing tier 402 can be coupled to the network nodes via fiber-optic cables. Each set-top box device 416, 424 can process data received via the access network 466, via an IPTV software platform.

The first set-top box device 416 can be coupled to a first external display device, such as a first television monitor 418, and the second set-top box device 424 can be coupled to a second external display device, such as a second television monitor 426. Moreover, the first set-top box device 416 can communicate with a first remote control 420, and the second set-top box device 424 can communicate with a second remote control 428. The set-top box devices 416, 424 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 416, 424 can receive data, video, or any combination thereof, from the client-facing tier 402 via the access network 466 and render or display the data, video, or any combination thereof, at the display device 418, 426 to which it is coupled. In an illustrative embodiment, the set-top box devices 416, 424 can include tuners that receive and decode television programming signals or packet streams for transmission to the display devices 418, 426. Further, the set-top box devices 416, 424 can include a STB processor 470 and a STB memory device 472 that is accessible to the STB processor 470. In one embodiment, a computer program, such as the STB computer program 474, can be embedded within the STB memory device 472. In another illustrative embodiment, a user computing device 484, such as a personal computer, laptop or local server, can be coupled to a set-top box device, such as the second representative set-top box device 424, for example, via a universal serial bus (USB) connection or other connection.

In an illustrative embodiment, the client-facing tier 402 can include a client-facing tier (CFT) switch 430 that manages communication between the client-facing tier 402 and the access network 466 and between the client-facing tier 402 and the private network 410. As illustrated, the CFT switch 430 is coupled to one or more data servers, such as D-servers 432, that store, format, encode, replicate, or otherwise manipulate or prepare video content for communication from the client-facing tier 402 to the set-top box devices 416, 424. The CFT switch 430 can also be coupled to a terminal server 434 that provides terminal devices with a connection point to the private network 410. In a particular embodiment, the CFT switch 430 can be coupled to a video-on-demand (VOD) server 436 that stores or provides VOD content imported by the IPTV system 400. Further, the CFT switch 430 is coupled to one or more video servers 480 that receive video content and transmit the content to the set-top boxes 416, 424 via the access network 466.

In an illustrative embodiment, the client-facing tier 402 can communicate with a large number of set-top boxes, such as the representative set-top boxes 416, 424 over a wide geographic area, such as a regional area, a metropolitan area, a viewing area, a designated market area or any other suitable geographic area, market area, or subscriber or customer group that can be supported by networking the client-facing tier 402 to numerous set-top box devices. In a particular embodiment, the CFT switch 430, or any portion thereof, can include a multicast router or switch that feeds one or more video streams from a video server to multiple set-top box devices.

As illustrated in FIG. 4, the application tier 404 can communicate with both the private network 410 and the public network 412. The application tier 404 can include a first application tier (APP) switch 438 and a second APP switch 440. In a particular embodiment, the first APP switch 438 can be coupled to the second APP switch 440. The first APP switch 438 can be coupled to an application server 442 and to an OSS/BSS gateway 444. In a particular embodiment, the application server 442 can provide applications to the set-top box devices 416, 424 via the access network 466, which enable the set-top box devices 416, 424 to provide functions, such as display, messaging, processing of IPTV data and VOD material, etc. In a particular embodiment, the OSS/BSS gateway 444 includes operation systems and support (OSS) data, as well as billing systems and support (BSS) data. In one embodiment, the OSS/BSS gateway 444 can provide or restrict access to an OSS/BSS server 464 that stores operations and billing systems data.

The second APP switch 440 can be coupled to a domain controller 446 that provides Internet access, for example, to users at their computers 468 via the public network 412. For example, the domain controller 446 can provide remote Internet access to IPTV account information, e-mail, personalized Internet services, or other online services via the public network 412. In addition, the second APP switch 440 can be coupled to a subscriber and system store 448 that includes account information, such as account information that is associated with users who access the IPTV system 400 via the private network 410 or the public network 412. In an illustrative embodiment, the subscriber and system store 448 can store subscriber or customer data and create subscriber or customer profiles that are associated with IP addresses of corresponding set-top box devices 416, 424.

In a particular embodiment, the application tier 404 can include a client gateway 450 that communicates data directly to the client-facing tier 402. In this embodiment, the client gateway 450 can be coupled directly to the CFT switch 430. The client gateway 450 can provide user access to the private network 410 and the tiers coupled thereto. In an illustrative embodiment, the set-top box devices 416, 424 can access the IPTV system 400 via the access network 466, using information received from the client gateway 450. User devices can access the client gateway 450 via the access network 466, and the client gateway 450 can allow such devices to access the private network 410 once the devices are authenticated or verified. Similarly, the client gateway 450 can prevent unauthorized devices, such as hacker computers or stolen set-top box devices from accessing the private network 410, by denying access to these devices beyond the access network 466.

For example, when the first representative set-top box device 416 accesses the client-facing tier 402 via the access network 466, the client gateway 450 can verify subscriber information by communicating with the subscriber and system store 448 via the private network 410. Further, the client gateway 450 can verify billing information and status by communicating with the OSS/BSS gateway 444 via the private network 410. In one embodiment, the OSS/BSS gateway 444 can transmit a query via the public network 412 to the OSS/BSS server 464. After the client gateway 450 confirms subscriber and/or billing information, the client gateway 450 can allow the set-top box device 416 to access IPTV content and VOD content at the client-facing tier 402. If the client gateway 450 cannot verify subscriber information for the set-top box device 416, e.g., because it is connected to an unauthorized twisted pair, the client gateway 450 can block transmissions to and from the set-top box device 416 beyond the access network 466.

As indicated in FIG. 4, the acquisition tier 406 includes an acquisition tier (AQT) switch 452 that communicates with the private network 410. The AQT switch 452 can also communicate with the operations and management tier 408 via the public network 412. In a particular embodiment, the AQT switch 452 can be coupled to a live acquisition server 454 that receives or acquires television content, movie content, advertisement content, other video content, or any combination thereof, from a broadcast service 456, such as a satellite acquisition system or satellite head-end office. In a particular embodiment, the live acquisition server 454 can transmit content to the AQT switch 452, and the AQT switch 452 can transmit the content to the CFT switch 430 via the private network 410.

In an illustrative embodiment, content can be transmitted to the D-servers 432, where it can be encoded, formatted, stored, replicated, or otherwise manipulated and prepared for communication from the video server(s) 480 to the set-top box devices 416, 424. The CFT switch 430 can receive content from the video server(s) 480 and communicate the content to the CPE 414, 422 via the access network 466. The set-top box devices 416, 424 can receive the content via the CPE 414, 422, and can transmit the content to the television monitors 418, 426. In an illustrative embodiment, video or audio portions of the content can be streamed to the set-top box devices 416, 424.

Further, the AQT switch 452 can be coupled to a video-on-demand importer server 458 that receives and stores television or movie content received at the acquisition tier 406 and communicates the stored content to the VOD server 436 at the client-facing tier 402 via the private network 410. Additionally, at the acquisition tier 406, the video-on-demand (VOD) importer server 458 can receive content from one or more VOD sources outside the IPTV system 400, such as movie studios and programmers of non-live content. The VOD importer server 458 can transmit the VOD content to the AQT switch 452, and the AQT switch 452, in turn, can communicate the material to the CFT switch 430 via the private network 410. The VOD content can be stored at one or more servers, such as the VOD server 436.

FIG. 4 further illustrates that the operations and management tier 408 can include an operations and management tier (OMT) switch 460 that conducts communication between the operations and management tier 408 and the public network 412. In the embodiment illustrated by FIG. 4, the OMT switch 460 is coupled to a TV2 server 462. Additionally, the OMT switch 460 can be coupled to an OSS/BSS server 464 and to a simple network management protocol (SNMP) monitor 486 that monitors network devices within or coupled to the IPTV system 400. In a particular embodiment, the OMT switch 460 can communicate with the AQT switch 452 via the public network 412. For example, the OSS/BSS server 464 of FIG. 4 may be the service provider OSS 136 of FIG. 1. Further, the network RUBY 465 may be in communication with the OMT switch 460 and with the OSS/BSS server 464. In one embodiment, the network RUBY 465 of FIG. 4 is the network RUBY 132 of FIG. 1. Further, a source 467 of rules and configuration data may be accessible to the network RUBY 465. In one embodiment, the source 467 of rules and configuration data is the rules and configuration data 134 of FIG. 1.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, FIG. 4 is an illustrative embodiment of an IPTV system, and one or more changes may be made to the IPTV system of FIG. 4 without departing from the scope of the disclosure. As another example, while the micro-RUBY logic 128 of FIG. 1 is shown within the CPE device 102, the micro-RUBY logic 128 may also be stored on an external storage medium communicatively coupled to the CPE device 128 (e.g., a flash drive). Similarly, the micro-RUBY logic 415, 423 of FIG. 4 associated with either or both of the CPE devices 414, 422 may be stored on external storage media. Accordingly, the disclosure and the figures are to be regarded as illustrative rather than restrictive.

Figure 5:
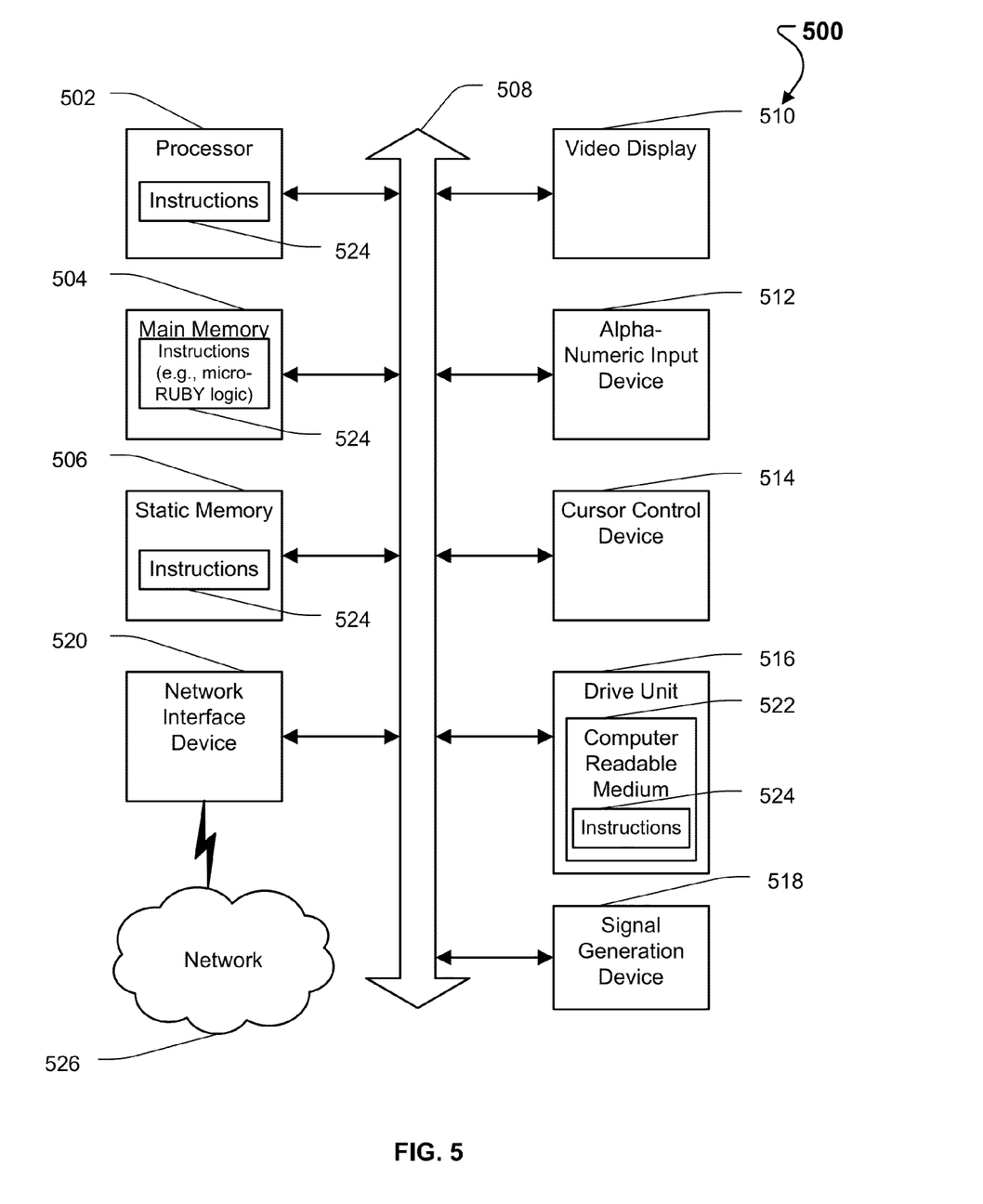
FIG. 5 is a block diagram of an illustrative embodiment of a general computer system.

Referring to FIG. 5, an illustrative embodiment of a general computer system is shown and is designated 500. For example, the computer system 500 may include the CPE device 102, the STB device 108, the computers 114, 122, the telephone 118, or the smart phone 124 of FIG. 1, or the CPE device 200 of FIG. 2. The computer system 500 includes a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices.

In a networked deployment, the computer system may operate in the capacity of a set-top box device, a server, or a mobile computing device. The computer system 500 can also be implemented as or incorporated into various devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics-processing unit (GPU), or both. Moreover, the computer system 500 can include a main memory 504 and a static memory 506 that can communicate with each other via a bus 508. As shown, the computer system 500 may further include or be coupled to a video display unit 510, such as a liquid crystal display (LCD), an organic light emitting diode (OLED), a flat panel display, a solid-state display, or a projection display. For example, the video display unit 510 may be the display device 112 of FIG. 1. Additionally, the computer system 500 may include an input device 512, such as a keyboard, a remote control device, and a cursor control device 514, such as a mouse. The computer system 500 can also include a disk drive unit 516, a signal generation device 518, such as a speaker or remote control device, and a network interface device 520. The network interface device 520 may be coupled to other devices (not shown) via a network 526.

In a particular embodiment, as depicted in FIG. 5, the disk drive unit 516 may include a computer-readable non-transitory medium 522 in which one or more sets of instructions 524, e.g. software, can be embedded. For example, the computer system 500 may be a residential gateway, and the instructions 524 may include the micro-RUBY logic 128 of the CPE device 102 of FIG. 1. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable non-transitory media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/item distributed processing, and parallel processing. Alternatively, virtual computer system processing can be constructed to implement one or more of the methods or functionality as described herein.

The present disclosure contemplates a computer-readable non-transitory medium that includes instructions 524 so that a device connected to a network 526 can communicate voice, video or data over the network 526. Further, the instructions 524 may be transmitted or received over the network 526 via the network interface device 520. For example, the network 526 may be the broadband network 130 of FIG. 1, and one or more rules and configuration data may be received at the CPE device 102 from the network source 132 (e.g., the Network RUBY) via the broadband network 130.

While the computer-readable non-transitory medium is shown to be a single medium, the term "computer-readable non-transitory medium" includes a single medium or multiple media, such as a centralized or distributed database, and/or associated caches and servers that store one or more sets of instructions. The term "computer-readable non-transitory medium" shall also include any medium that is capable of storing a set of instructions for execution by a processor or that cause a computer system to perform any one or more of the methods or operations disclosed herein.

In a particular non-limiting, exemplary embodiment, the computer-readable non-transitory medium can include a solid-state memory such as a memory card or other package that houses one or more non-volatile read-only memories. Further, the computer-readable non-transitory medium can be a random access memory or other volatile re-writable memory. Additionally, the computer-readable non-transitory medium can include a magneto-optical or optical medium, such as a disk or tapes. Accordingly, the disclosure is considered to include any one or more of a computer-readable non-transitory storage medium and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk;

or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g. TCP/IP, UDP/IP, HTML, X10, SIP, TR-069, INSTEON, WEP, Wi-Fi and HTTP) and standards for viewing media content (e.g. MPEG and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   detecting, at a customer premises equipment device, a problem associated with a network device that is communicatively coupled to the customer premises equipment device via a local area network;
   selecting, based on the problem, a subset of rules from a set of rules, the subset of rules having a priority that is related to a severity of the problem, wherein the set of rules is received at the customer premises equipment device from a network source;
   determining, at the customer premises equipment device, whether the problem is locally correctable based on the subset of rules, wherein the subset of rules includes multiple corrective actions that are selectable for initiation based on the problem;
   subsequent to a determination by the customer premises equipment device that the problem is locally correctable, selecting and initiating, at the customer premises equipment device, a first corrective action of the multiple corrective actions to resolve the problem; and
   subsequent to a determination by the customer premises equipment device that the problem is not locally correctable, initiating transmission of data associated with the problem from the customer premises equipment device to a network operation support system via a wide area network.

2. The method of claim 1, wherein the customer premises equipment device includes a residential gateway, and wherein the local area network is associated with a customer premises, and wherein the wide area network includes an access network of an internet protocol television system.

3. The method of claim 1, further comprising:
   receiving, at the customer premises equipment device, device configuration data from the network source via the wide area network; and
   storing the set of rules and the device configuration data at a memory of the customer premises equipment device.

4. The method of claim 3, wherein a determination whether the problem is locally correctable is further based on the device configuration data received from the network source.

5. The method of claim 3, further comprising receiving an updated set of rules and updated device configuration data from the network source for the network device.

6. The method of claim 1, further comprising initiating a second corrective action at the customer premises equipment device in response to an input received from the network operation support system that indicates the second corrective action.

7. The method of claim 1, wherein the network device comprises a set-top box device, and wherein the first corrective action includes a reboot of the set-top box device.

8. The method of claim 1, wherein the local area network includes a wireless local area network, and wherein the first corrective action includes communicating with the network device via a wireless encryption protocol.

9. The method of claim 1, further comprising providing, via the customer premises equipment device, an advertisement for additional services based on the data associated with the problem.

10. The method of claim 1, further comprising:
    detecting an additional problem that is associated with the network device;
    prior to selecting the subset of rules, determining whether the problem and the additional problem are related; and
    selecting the subset of rules based on the problem and based on the additional problem when the problem and the additional problem are related.

11. The method of claim 1, wherein the set of rules comprises a subset of a set of network rules, and wherein the set of network rules is updated based on the data associated with the problem transmitted to the network operation support system.

12. The method of claim 1, wherein the priority of the subset of rules is further related to a scope of the problem.

13. The method of claim 1, further comprising initiating transmission of the data associated with the problem from the customer premises equipment device to the network operation support system via an alternate network when the problem is associated with the wide area network.

14. A customer premises equipment device comprising:
a processor; and
a memory accessible to the processor, the memory storing instructions that, when executed by the processor, cause the processor to perform operations comprising:
receiving a set of rules from a network source via a wide area network;
detecting a problem associated with a network device communicatively coupled to the customer premises equipment device via a local area network;
selecting, based on the problem, a subset of rules from the set of rules, the subset of rules having a priority that is related to a severity of the problem;
determining whether the problem associated with the network device is locally correctable based on the subset of rules, wherein the subset of rules includes multiple corrective actions that are selectable for initiation at the customer premises equipment device based on the problem;
selecting and initiating a first corrective action of the multiple corrective actions to resolve the problem subsequent to a determination that the problem is locally correctable; and
initiating transmission of data associated with the problem to a network system via the wide area network subsequent to a determination that the problem is not locally correctable.

15. The customer premises equipment device of claim 14, wherein the operations further comprise:
collecting performance data associated with the network device;
determining whether a negative performance trend is attributed to the network device based on the collected performance data; and
initiating a second corrective action of the multiple corrective actions subsequent to a determination that a negative performance trend value satisfies a threshold value.

16. The customer premises equipment device of claim 15, wherein the operations further comprise sending the collected performance data to the network system when the negative performance trend value satisfies the threshold value.

17. The customer premises equipment device of claim 14, wherein the operations further comprise:
receiving an updated set of rules from the network source via the wide area network; and
determining whether the problem associated with the network device is locally correctable based on a second subset of rules of the updated set of rules.

18. A computer-readable storage device storing instructions, the instructions executable by a processor to cause the processor to perform operations comprising:
detecting a problem associated with a network device communicatively coupled to a customer premises equipment device via a local area network;
selecting, based on the problem, a subset of rules from a first set of rules, the subset of rules having a priority that is related to a severity of the problem, wherein the first set of rules is received at the customer premises equipment device from a network source;
determining, at the customer premises equipment device, whether the problem associated with the network device is locally correctable based on the subset of rules, wherein the subset of rules includes multiple corrective actions that are selectable for initiation based on the problem;
initiating a particular corrective action of the multiple corrective actions to resolve the problem subsequent to a determination that the problem is locally correctable; and
initiating transmission of data associated with the problem to a network operation support system subsequent to a determination that the problem is not locally correctable.

19. The computer-readable storage device of claim 18, wherein the operations further comprise:
detecting a new device communicatively coupled to the customer premises equipment device via the local area network;
requesting data associated with the new device from the network source via a wide area network; and
receiving a second set of rules and device configuration data associated with the new device from the network source.

20. The computer-readable storage device of claim 19, wherein the operations further comprise generating a graphical user interface adapted to receive a modification to the second set of rules or to the device configuration data associated with the new device.

* * * * *